Feb. 20, 1923.
J. T. McCULLOUGH
CUTTER
Filed May 20, 1922
1,446,194
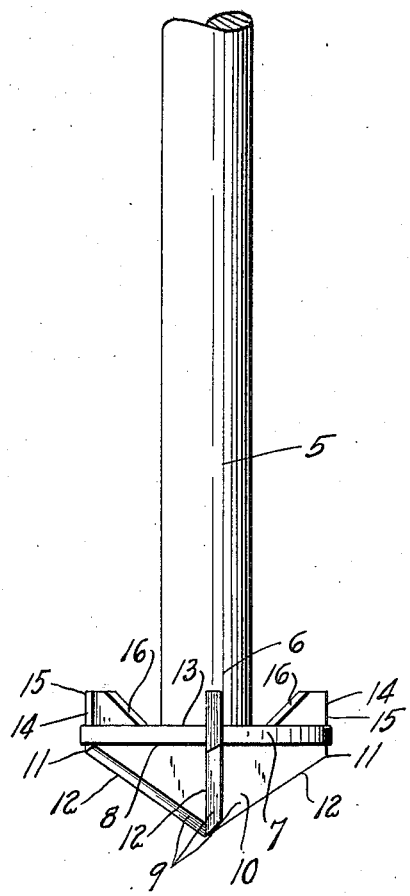
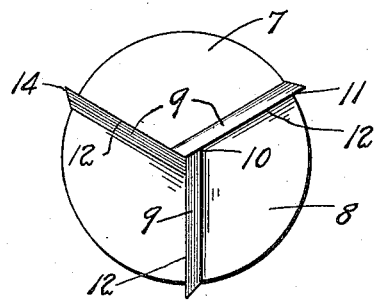
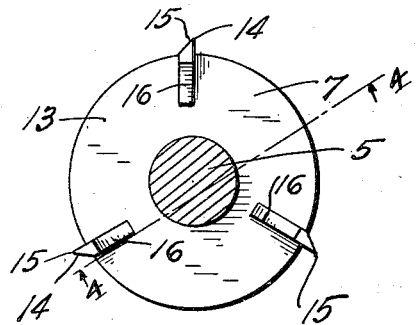
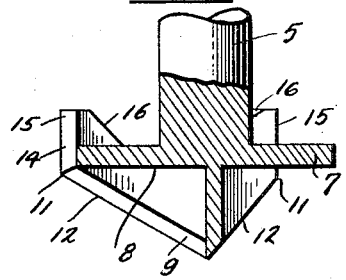
Inventor
John T. McCullough
By Watson E. Coleman
Attorney Patented Feb. 20, 1923.

1,446,194

UNITED STATES PATENT OFFICE.

JOHN T. McCULLOUGH, OF BROOMALL, PENNSYLVANIA.

CUTTER.

Application filed May 20, 1922. Serial No. 562,343.

*To all whom it may concern:*

Be it known that I, JOHN T. McCULLOUGH, a citizen of the United States, residing at Broomall, in the county of Delaware and State of Pennsylvania, have invented certain new and useful Improvements in Cutters, of which the following is a specification, reference being had to the accompanying drawings.

This invention relates to cutters, and has for its object to provide a cutter for use in drilling holes and openings of particular shapes.

It is another object of the invention to provide a cutter of this character capable of being used to drill a bore considerably larger in diameter than the diameter of the cutter, and at the same time to drill the bore the depth desired, by manipulating the cutter.

It is a further object of the invention to provide a cutter of this character having a cutter head in the form of a disc from which blades extend for cutting in one direction, the ends of the blades extending over the periphery of the disc for cutting in another direction.

With these and other objects in view, the invention consists in the improved construction and arrangement of parts to be hereinafter more particularly described, fully claimed and illustrated in the accompanying drawings, in which:—

Figure 1 is a front elevation of the cutter, one of the blades being shown in edge elevation, the remaining blades being hidden by the rotundity of the disc;

Figure 2 is a bottom plan view of the cutter; and

Figure 3 is a top plan view with the shank of the cutter being shown in section.

Figure 4 is a section on line 4—4 of Figure 3.

This cutter is intended to be used in connection with wood working or metal working machines wherein bores of various sizes and shapes are made in metal or wood, for instance, in the drilling of fence rail openings in fence posts. These openings must not only correspond in length to the width of the fence rail, but correspond in width to the thickness of the fence rail.

It is possible to drill a hole of this type, or in other words, an oblong bore by the manipulation of a cutter comprising a shank 5 capable of being mounted on a power operated machine or a hand operated device. The end portion 6 of the shank is provided with a disc 7 considerably larger in diameter than the diameter of the shank. This disc forms the body portion of the cutter. Projecting from the outer face 8 of the disc are a plurality of blades 9. Each blade is relatively wide at its end 10 and tapers from its end 10 to its end 11. Each of the end portions 10 of the blades is disposed at the central portion of the disc so that the blades cooperate to substantially provide a conical cutting element. Any number of these blades may be provided, the blades being formed integral with the disc. The outer edge of each blade 9 is beveled to provide a cutting edge 12, the bevel, of course, being only on one side of the blade.

It will be noted that the end portions 11 of each of the blades 9 extend over the periphery of the disc 7, the cutting edge 12 of the end 11 extending over the periphery of the disc substantially in parallel relation to the shank 5. Projecting from the inner face 13 of the disc, adjacent the periphery of the disc, is a plurality of blades 14, each blade having its outer edge beveled to provide a cutting edge 15, said cutting edge merging with the cutting edge 12 of the adjacent blade so that each of the blades 14 cooperates with the adjacent blade 9 to provide a continuous cutting element from the face 13 of the disc to the central portion of the outer face 8 of the disc. The inner edge 16 of each of the blades 14 tapers from the end of the blade to the face 13 of the disc so as to substantially brace each of the blades 14. The cutting edges 15 of the blades 14 are disposed substantially parallel to the shank 5, said edges being beveled similar to the beveled edges of the blades 9, that is, only one side of the edge of the blade is beveled.

In the use of the cutter the blades 9 serve to cut the bore to the depth desired, upon movement of the shank into the work. The blades 14 cut the bore to the shape desired, such as elongated, oblong, or a diameter considerably larger than the diameter of the disc 7 by movement of the shank and cutter longitudinally of the work. It will be noted that the cutting edge 15 of the face 14 is relatively long so that the cutting capacity of the blades 14 corresponds to the cutting capacity of the blades 9, therefore, both cutting operations can be performed simultaneously. By extending the cutting edges 12 of the end portion 11 of the blades 9 over the periphery, said cutting edges merge with the cutting edges 15 of the blades 14, so that the blades 14 cooperate with the blades 9 to provide a continuous cutting element and as the periphery of the disc, in view of the projecting edges 12 of the blades, is disposed inwardly of said blades, the disc does not interfere with the cutting operation of the device. At the same time the disc 7 serves to strengthen the cutting elements.

From the foregoing it will be readily seen that this invention provides a novel form of cutter capable of being applied to any machine or hand operated device for cutting bores or sockets of various shapes and depths, and all of these features are possessed by a cutter that can be manufactured in large quantities for a small amount.

What is claimed is:—

A cutter consisting of a shank, a disc on one end of the shank, a plurality of blades substantially radiating from the central portion of the disc, said blades being tapered longitudinally from a point at the central portion of the disc to a point at the periphery of the disc, blades carried by the opposite face of the disc, said blades having cutting edges disposed parallel to the shank of the cutter and merging with the cutting edges of the first mentioned blades.

In testimony whereof I hereunto affix my signature.

JOHN T. McCULLOUGH.